United States Patent Office 2,951,078
Patented Aug. 30, 1960

2,951,078

2-(AMINOALKYLAMINO)-METHYLPYRROLIDINES

John H. Biel, Milwaukee, Wis., assignor, by mesne assignments, to Lakeside Laboratories, Inc., Milwaukee, Wis., a corporation of Delaware No Drawing. Filed Aug. 21, 1957, Ser. No. 679,521

10 Claims. (Cl. 260—247.5)

This invention relates to 2-aminomethylpyrrolidine and, more particularly, is concerned with novel derivatives thereof.

There are provided according to this invention novel basically substituted derivatives of 2-aminomethyl-pyrrolidine of the formula

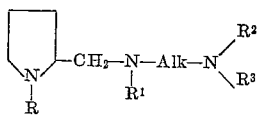

wherein R is an alkyl group, particularly a lower alkyl such as methyl, ethyl, propyl, isopropyl, butyl, pentyl, hexyl and the like, an alkenyl group such as the allyl group, an aralkyl group, particularly those in which the aryl moiety is phenyl or naphthyl and the alkyl moiety is a lower alkyl of which benzyl and phenethyl are representative, an alkenyl group such as propynyl, or a disubstituted amino group such as dimethylamino, diphenylamino, and dibenzylamino; $R^1$ is hydrogen, an alkyl group and particularly a lower alkyl, or an aralkyl group, particularly an aralkyl group in which the aryl moiety is phenyl or naphthyl and the alkyl moiety is a lower alkyl; Alk represents a straight or branched alkylene group having 2–10 carbons; and $R^2$ and $R^3$ represent the same or different substituents of the group consisting of hydrogen, alkyl groups, particularly lower alkyl groups such as methyl, ethyl, propyl, isopropyl, butyl, pentyl, hexyl and the like, cycloalkyl groups and particularly the cyclopentyl and cyclohexyl groups, alkenyl groups such as the allyl group, aryl groups, particularly wherein the aryl group is phenyl or naphthyl and such groups with nuclear substituents including hydroxyphenyl, lower alkoxyphenyl, halophenyl and lower acyloxyphenyl groups such as chlorophenyl, methoxyphenyl and acetoxyphenyl groups, aralkyl groups, particularly those in which the alkyl moiety is a lower alkyl and the aryl moiety is as described above for the aryl groups but including the 2-furfurylalkyl group, and groups wherein $R^2$ and $R^3$ are joined to form pyrrolidino, piperidino, morpholino, piperazino, N-lower alkyl-4-piperazino, N-halobenzyl-4-piperazino, N-p-loweralkoxybenzyl-N-2-pyridylamino, N-phenyl-N-benzylamino, N-methyl-N-benzodioxanyl-methylamino, N-2-thienyl-N-2-pyridylamino, N-o-halo-phenyl-4-piperazino, N-amino-4-piperazino, di-loweralkyl hydrazino, 7-theophyllino, 1,2,3,4-tetrahydroisoquinolino, 1,2,3,4-tetrahydroquinolino, isoindolino, 4-methyl-1-piperazino, 3-hydroxypiperidino and 4-hydroxypiperidino; and acid addition and quaternary ammonium salts thereof.

Compounds of the above formula are produced by reacting an N-substituted 3-piperidyl halide or 3-piperidyl p-toluenesulfonate with an appropriate N,N-disubstituted aminoalkylamine. This reaction may be represented as follows:

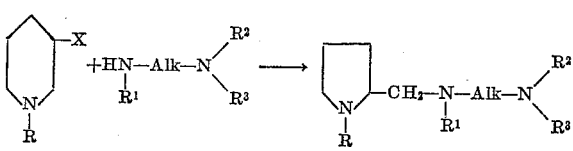

wherein X is chlorine, bromine, iodine or p-toluenesulfonate, and R, $R^1$, $R^2$, $R^3$ and Alk have the significance previously assigned.

During the reaction a ring contraction from a piperidine to a 2-pyrrolidylmethyl ring takes place to yield the desired compounds. The reaction is readily achieved by combining the reactants in a suitable liquid reaction medium such as ethanol, methyl isobutylcarbinol, diisobutylcarbinol, toluene and xylene and refluxing the mixture for several hours. Following the reaction the product formed may be isolated by fractional distillation.

Typical of the N-substituted-3-piperidyl halides and 3-piperidyl p-toluenesulfonates which may be used in this process are N-methyl-3-chloropiperidine, N-butyl-3-bromopiperidine, N-allyl-3-chloropiperidine, N-propargyl-3-iodopiperidine, N-o-chlorobenzyl-3-piperidyl-p-toluenesulfonate, N-dimethylamino-3-chloropiperidine, N-p-methoxyphenethyl-3-bromopiperidine, N-3,4-methylenedi-oxyphenylisopropyl-3-iodopiperidine, and N-p-hydroxyphenethyl-3-bromopiperidine.

Typical of the N,N-disubstituted aminoalkylamines which may be used in the process are: 3-dimethylaminopropylamine, 4-diisobutylaminobutylamine, 2-diethyl-aminoethylamine, 8-dimethylaminooctylamine, 2-diallyl-aminoethylamine, diphenylaminoethylamine, 3-methyl-ethylaminopropylamine, 3-dipropargylaminopropylamine, 2-(N-methyl-N-allylamino)ethylamine, 2-(N-cyclohexyl-N-methylamino)ethylamine, 3-(N-cyclopentenyl-N-ethyl-amino)-pyropylamine, 2 - (N-o-chlorobenzyl - N-methyl-amino)ethylamine, 2-(N-p-methoxybenzyl-N-2-pyridyl-amino)ethylamine, 2-(N-2'-furfurylmethyl-N-2-pyridyl-amino)-ethylamine, N-2-(10-phenothiazinyl)-ethyl-methylamine, 2-pyrrolidinoethylamine, 3-morpholino-propylamine, N-3-piperidinopropyl methylamine, 2-(4-methylpiperazino)ethylamine, 2-(4-chlorobenzhydryl-piperazine)ethylamine and 2-(7-theophyllino)ethylamine.

Some of the novel compounds which are formed using the described reaction and reactants are N,N-dimethyl-N'-(1-methyl-2-pyrrolidylmethyl)-propylenediamine, N-pyrrolidino-N'-(1-methyl-2-pyrrolidylmethyl)-propylene-amine, N-morpholino-N'-(1-methyl-2-pyrrolidylmethyl)-propylenediamine, 3-(4-methylpiperazino)-N-(1-methyl-2-pyrrolidylmethyl)-propyleneamine, N,N-dimethyl-N'-methyl-N'-(1-methyl-2-pyrrolidylmethyl)-propylenediamine, N-cyclohexyl-N-methyl-N'-(1-benzyl-2-pyrrolidyl-methyl)-ethylenediamine, N,N-dipropargyl-N'-(1-propyl-2-pyrrolidylmethyl)pentylenediamine and other similar compounds corresponding to the reactants used.

Acid addition salts of the novel compounds provided by this invention are produced by contacting one mole of the polyamine with one, two, three or four moles of a mineral or organic acid according to the number of basic groups present. Acids such as hydrochloric, sulfuric, formic, maleic, fumaric and citric are representative of those that may be used to form salts.

Quaternary ammonium salts are produced by combining one mole of the polyamine with the required number of moles of a suitable alkylating agent to form the salts. Alkylating agents such as dimethyl sulfate, methyl bromide, ethyl bromide, methyl iodide, o-chlorobenzyl bromide and phenethyl iodide are a few of the alkylating agents which may be used to form salts.

The acid addition salts of the above polyamines are useful as diuretic agents and the quaternary salts useful as hypotensive and ganglionic blocking agents.

The following examples are added to illustrate the preparation of representative compounds provided by the invention but it is to be understood that the invention shall not thereby be restricted.

EXAMPLE 1

$N,N$-dimethyl-$N'$-($1$-methyl-$2$-pyrrolidylmethyl)-propylenediamine

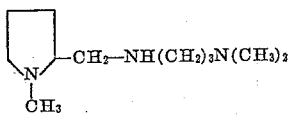

A mixture containing 33.9 g. (0.25 mole) of N-methyl-3-chloropiperidine, 25.7 g. (0.25 mole) of 3-dimethyl-amino-propylamine and 250 cc. of methyl isobutylcarbinol was allowed to reflux with stirring for 15 hours. The solvent was removed by vacuum distillation and the residue taken up in water. The aqueous solution was saturated with solid potassium hydroxide, extracted repeatedly with ether and the ether extracts dried with potassium carbonate. The product was isolated by fractional distillation and collected at 95° C. (2.2 mm.), yield 27.2 g. (69%); $N_D^{29}$ 1.4661.

*Analysis.*—Calcd. for $C_{11}H_{25}N_3$: N, 21.20. Found: N, 20.71

EXAMPLE 2

$N,N$-dimethyl-$N'$-($1$-methyl-$2$-pyrrolidylmethyl)-propylenediamine trimaleate To 17.4 g. (0.15 mole) of maleic acid in 125 ml. of ethanol was added 10.0 g. (0.05 mole) of the base of Example 1 in 100 ml. of ethanol. The mixture was refluxed with stirring for 15 minutes and filtered hot. The produced was collected on the filter, yield 24.7 g. (90%), M.P. 135–136° C.

EXAMPLE 3

$N,N$-dimethyl-$N'$-($1$-methyl-$2$-pyrrolidinomethyl$)$-propylenediamine dimethobromide To 15.0 g. of the base (Example 1) in 150 cc. of isopropyl alcohol was added 14.5 g. of methyl bromide and the mixture allowed to stand at room temperature for one week. The product was collected by filtration and recrystallized from 250 cc. of 4:1 mixture of isopropyl alcohol: ethanol, yield 8.5 g.; M.P. 275–277° C.

*Analysis.*—Calcd. for $C_{13}H_{31}Br_2N_3$: Br, 41.13; N, 10.78. Found: Br, 40.99; N, 10.62.

EXAMPLE 4

The following compounds and maleate salts thereof have also been prepared according to the described reaction using the appropriate reactants:

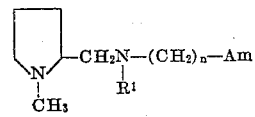

| No. | Am | R¹ | n | B.P. °C./mm. | Percent Yld. | $N_D^{25}$ | Assays Nitrogen Formula | Calcd. | Found |
|---|---|---|---|---|---|---|---|---|---|
| 1 | (C₂H₅)₂N— | H | 2 | 99–2.3 | 64.6 | ¹ 1.4642 | $C_{12}H_{27}N_3$ | 19.70 | 19.32 |
| 2 | (C₂H₅)₂N— | H | 3 | 120–122/4 | 64.22 | ¹ 1.4665 | $C_{13}H_{27}N_3$ | 18.48 | 17.81 |
| 3 | ◯N— | H | 3 | 142–143°/6 | 61.06 | 1.4837 | $C_{13}H_{27}N_3$ | 18.65 | 18.36 |
| 4 | O◯N— | H | 3 | 125–127°/0.4 | 64.2 | ¹ 1.4875 | $C_{13}H_{27}N_3O$ | 17.41 | 17.05 |
| 5 | CH₃N◯N— | H | 3 | 154–155°/2.4 | 55.03 | 1.4879 | $C_{14}H_{30}N_4$ | 22.02 | 21.54 |
| 6 | (CH₃)₂N— | CH₃ | 3 | 107/4.7 | 52.57 | ¹ 1.4637 | $C_{12}H_{27}N_3$ | 20.66 | 19.53 |

¹ $N_D^{20°}$.

MALEATE SALTS

| No. | Percent Yld. | M.P. °C. | Formula | ASSAYS Nitrogen Calcd. | Found | Neutral Equivalent Calcd. | Found |
|---|---|---|---|---|---|---|---|
| 1 | 68.01 | 119–120 | $C_{24}H_{39}N_3O_{12}$ | 7.48 | 7.39 | 93.60 | 91.35 |
| 2 | 84.43 | 116–117 | $C_{25}H_{41}N_3O_{12}$ | 7.30 | 7.19 | 95.93 | 98.00 |
| 3 | 95.54 | 140–142 | $C_{25}H_{39}N_3O_{12}$ | 7.37 | 7.25 | 95.60 | 93.66 |
| 4 | 94.67 | 155–157 | $C_{25}H_{39}N_3O_{13}$ | 7.13 | 7.04 | 98.27 | 97.92 |
| 5 | 97.38 | 160–161 | $C_{30}H_{46}N_4O_{16}$ | 7.80 | 7.78 | 89.84 | 90.76 |
| 6 | 93.5 | 108–110 | $C_{24}H_{39}N_3O_{12}$ | 7.48 | 7.45 | 93.59 | 93.02 |

Various changes and modifications of the invention can be made and, to the extent that such variations incorporate the spirit of this invention, they are intended to be included within the scope of the appended claims.

What is claimed is:

1. A member of the group consisting of compounds of the formula

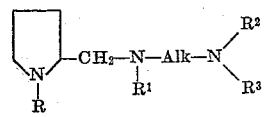

wherein R is a member of the group consisting of lower alkyl, propynyl, allyl and phenyl-lower alkyl groups, $R^1$ is a member of the group consisting of hydrogen, lower alkyl and phenyl-lower alkyl groups, Alk is an alkylene group of 2 to 10 carbons, and $R^2$ and $R^3$ are members of the group consisting of hydrogen, lower alkyl, cyclohexyl, cyclopentyl, allyl, phenyl, hydroxyphenyl, lower alkoxyphenyl, halophenyl, acetoxyphenyl and phenyl-lower alkyl groups and groups formed by joining $R^2$ and $R^3$ to form a ring with the nitrogen in the ring of the group consisting of pyrrolidino, piperidino, morpholino, piperazino, N-lower alkyl-4-piperazino, N-halobenzyl - 4 - piperazino, N-p-loweralkoxybenzyl-N-2-pyridylamino, N - phenyl - N-benzylamino, N - methyl - N - benzodioxanylmethylamino, N-2-thienyl-N-2-pyridylamino, N-o-halophenyl - 4 - piperazino, N-amino-4-piperazino, di-loweralkyl hydrazino, 7-theophyllino, 1,2,3,4-tetrahydroisoquinolino, 1,2,3,4-tetrahydroquinolino, isoindolino, 4-methyl-1-piperazino, 3-hydroxypiperidino and 4-hydroxypiperidino, nontoxic acid addition salts thereof and nontoxic quaternary ammonium salts thereof of the group consisting of dimethyl sulfate, methyl bromide, ethyl bromide, methyl iodide, o-chlorobenzyl bromide and phenethyl iodide.

2. N,N-dimethyl-N'-(1 - methyl - 2 - pyrrolidylmethyl)-propylenediamine.

3. N,N - dimethyl-N'-methyl-N'-(1-methyl-2-pyyrolidylmethyl)-propylenediamine.

4. N,N-dimethyl-N'-(1 - methyl - 2 - pyrrolidylmethyl)-propylenediamine trimaleate.

5. N,N-dimethyl-N'-(1-methyl - 2 - pyrrolidinomethyl)-propylenediamine dimethobromide.

6. N,N-di-loweralkyl-N'-(1 - loweralkyl - 2 - pyrrolidylmethyl)-alkylenediamine, the alkylene group having 2 to 10 carbons.

7. N - (3 - pyrrolidinopropyl)-N-(1-methyl-2-pyrrolidylmethyl)-amine.

8. N-(3-morpholinopropyl)-N-(1-methyl-2-pyrrolidinomethyl)-amine.

9. N - [3-(4-methylpiperazino)-propyl]-N-(1-methyl-2-pyrrolidylmethyl)-amine.

10. The process which comprises reacting a compound of the formula

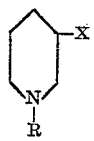

with a compound of the formula

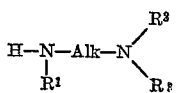

to produce a compound of the formula

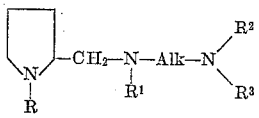

wherein X is a member of the group consisting of chlorine, bromine, iodine and p-toluenesulfonate, R is a member of the group consisting of lower alkyl, allyl, propynyl and phenyl-lower alkyl groups, $R^1$ is a member of the group consisting of hydrogen, lower alkyl and phenyl-lower alkyl groups, Alk is an alkylene group of 2 to 10 carbons, and $R^2$ and $R^3$ are members of the group consisting of hydrogen, lower alkyl, cyclohexyl, cyclopentyl, allyl, phenyl, hydroxyphenyl, lower alkoxyphenyl, halophenyl, acetoxyphenyl and phenyl-lower alkyl groups and groups formed by joining $R^2$ and $R^3$ to form a ring with the nitrogen in the ring of the group consisting of pyrrolidino, piperidino, morpholino, piperazino, N-lower alkyl-4-piperazino, N-halobenzyl-4-piperazino, N-p-loweralkoxybenzyl-N-2-pyridylamino, N-phenyl-N-benzylamino, N-methyl-N-benzodioxanylmethylamino, N-2-thienyl - N - 2 - pyridylamino, N-o-halophenyl-4-piperazino, N-amino-4-piperazino, di-loweralkyl hydrazino, 7-theophyllino, 1,2,3,4-tetrahydroisoquinolino, 1,2,3,4-tetrahydroquinolino, isoindolino, 4-methyl-1-piperazino, 3-hydroxypiperidino and 4-hydroxypiperidino.

References Cited in the file of this patent
UNITED STATES PATENTS

| | | |
|---|---|---|
| 2,502,151 | Horclois | Mar. 28, 1950 |
| 2,626,948 | Paterson | Jan. 27, 1953 |

OTHER REFERENCES

Idson: Chem. Reviews, vol. 47, p. 339 (1950).

UNITED STATES PATENT OFFICE

CERTIFICATION OF CORRECTION

Patent No. 2,951,078            August 30, 1960

John H. Biel

It is hereby certified that error appears in the above numbered patent requiring correction and that the said Letters Patent should read as corrected below.

Column 1, line 33, for "alkenyl" read -- alkynyl --; column 2, line 39, for "pyropylamine" read -- propylamine --; column 3, line 64, for "produced" read -- product --; column 5, line 11, for "pyyrolidyl" read -- pyrrolidyl --; column 6, line 33, list of references cited, under "UNITED STATES PATENTS," for "Paterson" read -- Finkelstein et al. --.

Signed and sealed this 2nd day of May 1961.

(SEAL)
Attest:

ERNEST W. SWIDER
Attesting Officer

DAVID L. LADD
Commissioner of Patents